March 31, 1942.  C. B. MOORE  2,278,132
MEASURING AND CONTROL INSTRUMENT
Filed Feb. 4, 1938    2 Sheets-Sheet 1

INVENTOR.
COLEMAN B. MOORE
BY George M Muschamp
ATTORNEY

March 31, 1942.  C. B. MOORE  2,278,132
MEASURING AND CONTROL INSTRUMENT
Filed Feb. 4, 1938  2 Sheets-Sheet 2

INVENTOR.
COLEMAN B. MOORE
BY George M. Munchamp
ATTORNEY

Patented Mar. 31, 1942

2,278,132

UNITED STATES PATENT OFFICE 2,278,132

MEASURING AND CONTROL INSTRUMENT

Coleman B. Moore, Carroll Park, Pa., assignor to The Brown Instrument Company, Philadelphia, Pa., a corporation of Pennsylvania Application February 4, 1938, Serial No. 188,737

9 Claims. (Cl. 74—1)

The general object of the present invention is to provide improved apparatus for producing control effects selectively dependent upon the changes in a control condition, such as the change in value of a temperature, pressure or other quantity, measured by measuring means included in or associated with the control apparatus. A more specific general object of the present invention is to provide a control instrument for the above-mentioned purposes which is characterized by special features of construction and arrangement giving the instrument desirable simplicity and reliability and contributing to a compactness not found in instruments previously employed for the same general purposes.

To this end there is disclosed a novel type of control in which one control effect is provided when the controlling condition is relatively high and a different control effect when said value is relatively low. If the value of the control condition is at a desired amount, an appropriate control action may be effected or not as desired.

In a practical embodiment of the invention, there is provided a lever which is first bodily moved to a position in accordance with the value of the controlling condition and is then pivoted to actuate a switch, which, through suitable connections, controls a motor that regulates the value of the condition. There is also provided a novel lever system that positions a member relative to a desired value of the condition and the present value thereof. This position of this member is used to determine the first position to which the above-mentioned lever is moved, prior to its control movement.

The various features of novelty which characterize the present invention are set forth in the claims annexed to and forming a part of this specification. For a better understanding of the invention, however, its advantages and specific objects obtained with it, reference should be had to the accompanying drawings and descriptive matter in which I have illustrated and described preferred embodiments of the invention.

Figure 1:
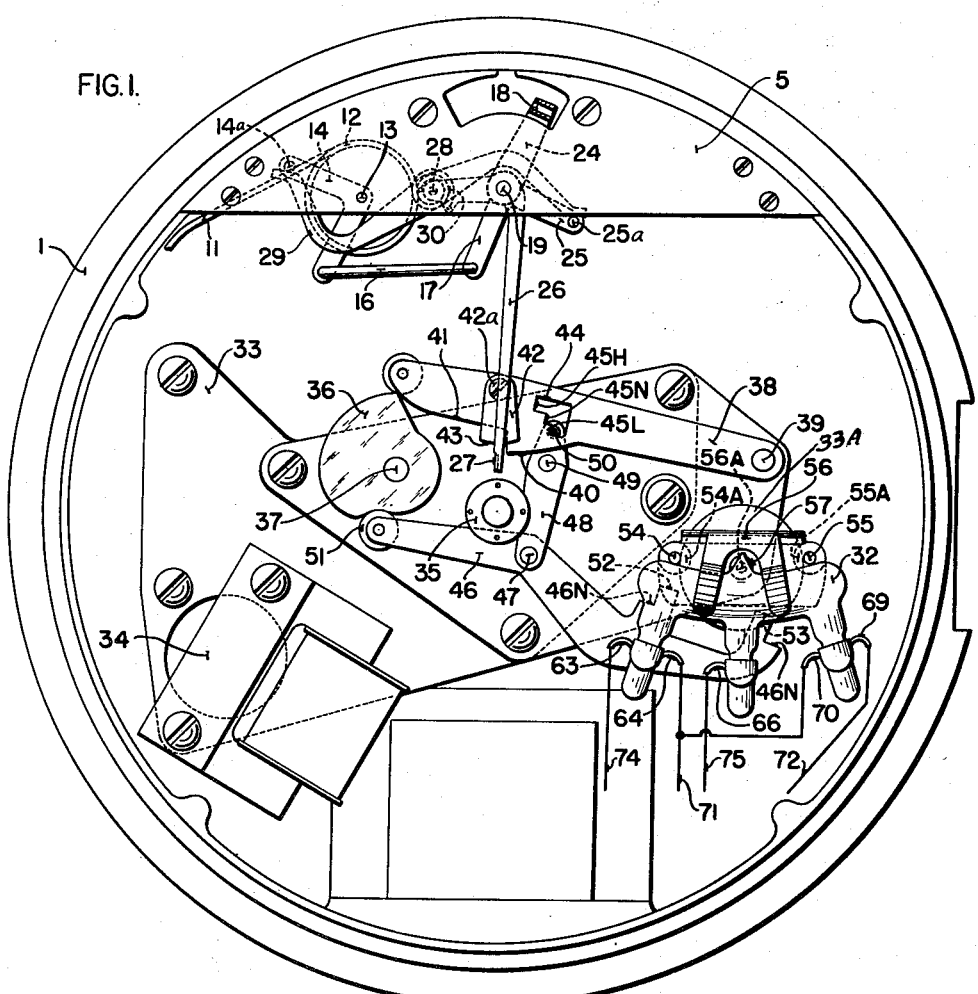
Fig. 1 is a view showing a preferred form of my control mechanism.

The temperature measuring and control mechanism of my invention is housed in a casing 1 of conventional circular shape, which casing is closed by a door 2 hinged thereto at 3 and provided with a lock 4. Within the casing, there is provided a sector plate 5 that has an opening in it through which a pen arm and an index arm may project. Fastened in the plane of and below segment 5 is another segment plate (not shown) which serves to cover the mechanism and act as a platen for a chart 6. The mechanism comprising my invention is located within the casing and behind the segment plate.

Figure 3:
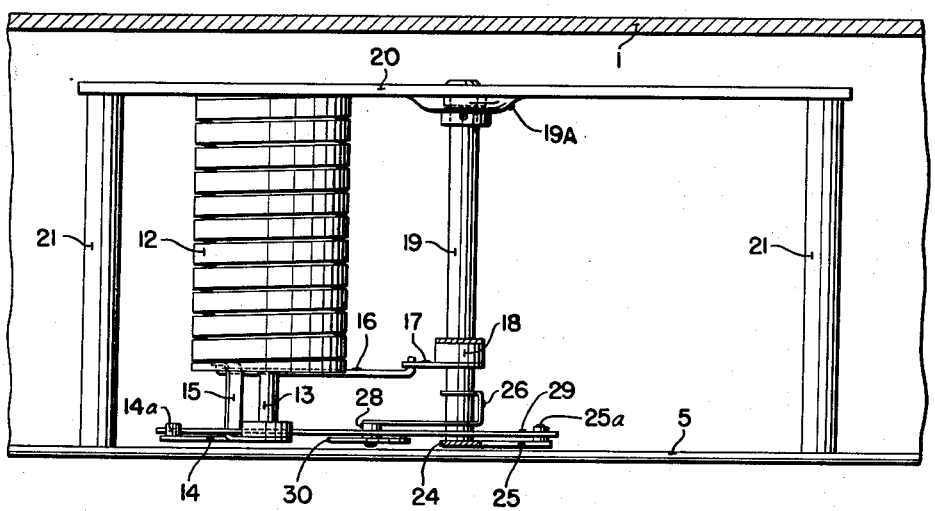
Fig. 3 is a top view showing the connections from a temperature responsive helix to a pen.
Figure 4:
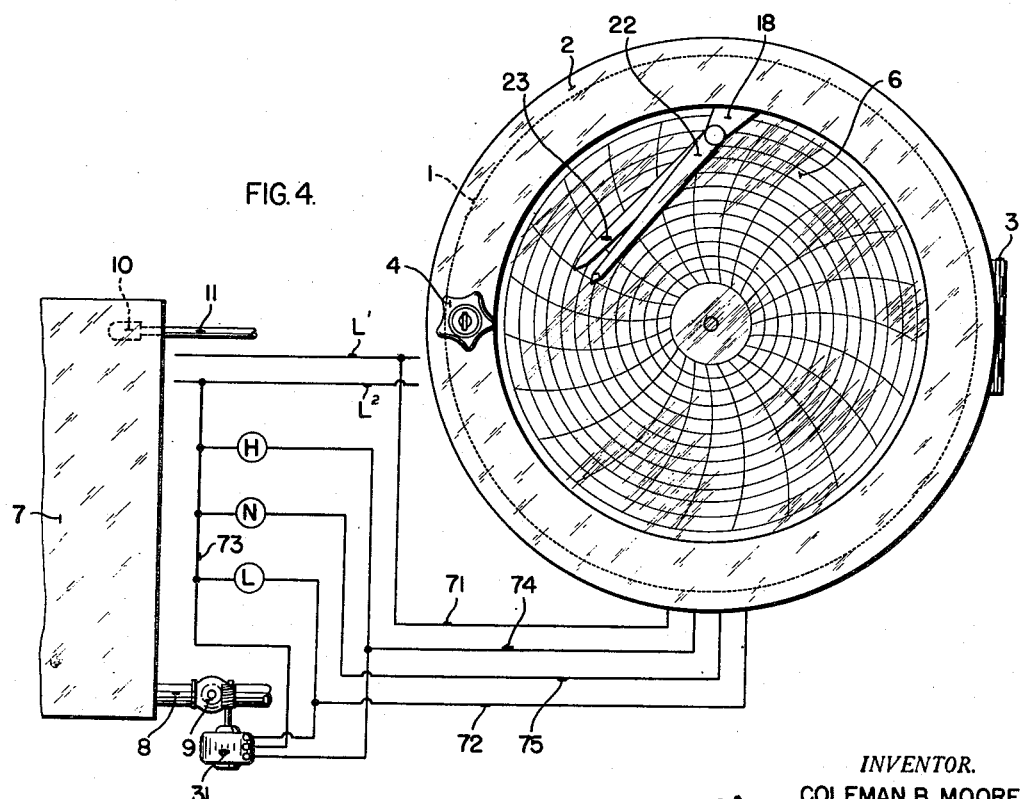
Fig. 4 is a diagram of a control system that may be used with my improved control mechanism.

A heater or furnace 7, the temperature of which is to be recorded and controlled, is supplied with a liquid or gas fuel through a pipe line 8 that has valve 9 therein to control the supply. Mounted within the heater is a temperature responsive device 10, usually in the form of a bulb. This bulb is connected by tubing 11 with an expansible Bourdon helix 12 mounted within the casing 1. The bulb, tube and helix are filled with some suitable substance which expands with an increase in heat so that an increase of temperature to which bulb 10 is subjected will cause a proportional expansion of the helix 12. Upon expansion of the helix a shaft 13 attached to one end thereof is rotated to turn a bell-crank 14 mounted thereon. One arm of the bell-crank is rearwardly offset as shown at 15 (Fig. 3) and has pivoted to its outer end a link 16, the other end of which is pivoted to arm 17 forming an extension of one leg of a yoke 18. This yoke is pivoted on shaft 19, which is in turn pivoted in a plate 20 attached by rods 21 to the sector plate 5. The other leg of the yoke extends forwardly through the opening of sector plate 5 and then downwardly and has attached to its outer end, at a point axially aligned with shaft 19, a pen arm 22. Therefore, upon changes in temperature in the furnace 7, helix 12 will be expanded or contracted, and, through the above-described linkage, pen arm 22 will be moved across the chart to make a record of the temperature changes thereon.

An index member 23 is provided to indicate the point at which the control has been set and at which point it is desired to keep the temperature of the furnace. This indicator is attached to yoke 24 that also extends through the opening in plate 5 and forms in effect one leg of a bell-crank whose other leg is indicated at 25. This bell-crank is attached to the front end of shaft 19 which is frictionally retained against movement in plate 20 by a spring washer 19A to insure that it will remain in its adjusted position until the adjustment is manually changed.

In order to utilize the present value of the condition being measured, which in this case is the temperature of heater 7, to control the condition and keep it at a desired value, it is necessary to provide a control member whose position is regulated jointly in accordance with the desired value and the present value of the condition. Such a member is shown as the angularly shaped lever 26, which is also pivoted on shaft 19 and has a normal slight gravitational bias clockwise. The lower end of the vertical leg of this lever is provided with a backwardly extending hook or edge 27, while the end of the horizontal arm has a pin 28 projecting therefrom. Pivotally mounted on pin 28 is an S-shaped member 29, one of whose ends engages pin 14a on bell-crank 14, while the other end engages pin 25a on arm 25 of yoke 24. The member 29 is biased in a clockwise direction about pin 28 by a hair spring 30, so that its respective ends will always engage pins 14a and 25a of the arms 14 and 25 respectively.

The above-described arrangement permits an arcuate movement of lever 26 around shaft 19 upon variations in temperature of furnace 7. As the temperature increases, bell-crank 14 will move clockwise, and lever 29, under the bias of spring 30, will follow it, pivoting around pin 25a, to lift pin 28 and move lever 26 clockwise. In a like manner, decrease in temperature of the furnace will move bell-crank 14 counter-clockwise and force lever 29 counter-clockwise around pin 25a to lower pin 28. A change in the setting of index 23 to increase the desired temperature of furnace 7 will mean that yoke 24 is rotated clockwise to lower the right end of lever 29 around pin 14a as a pivot and lower pin 28 to move lever 26 counter-clockwise. To lower the setting of the index, pin 28 is raised, and lever 26 is moved clockwise. If the setting of the index 23 is raised at a rate equal to a rise in temperature of furnace 7, the pin 28 will remain stationary, and lever 26 will not move.

The control mechanism proper is also located in the case 1, below the above-described mechanism. In the control of the temperature of furnace 7, an electric motor 31 is used to open or close valve 9 according to whether the temperature is lower or higher than the desired value, and, in addition, the lamps H, N, and L are lit to give a visual indication at some desired point of the condition of the furnace. To this end, there is provided in the mechanism a mercury switch 32 which is tilted in accordance with the value of the temperature to energize motor 31 and light the indicating lamps. The manner of accomplishing this will now be described.

Mounted within the casing 1 is a supporting plate 33 to hold the control mechanism. Upon this plate is fastened a suitable electric motor 34 which, through gearing (not shown) back of plate 33, drives at a constant speed of, for example, one revolution every twenty-four hours a chart supporting spindle 35. The motor 34 also drives, but at a much faster rate, cam 36 mounted on shaft 37. A lever 38, pivoted at 39 on plate 33, is provided with two edges 40 and 41 forming low and high control steps respectively, and has adjustably fastened thereto a member 42 which has a lower edge or neutral control step 43 that extends halfway between edges 40 and 41. Above-mentioned projection 27 of lever 26 extends transversely of and is adapted to be selectively engaged by edge 40, 41, or 43. As the lever 38 is raised by cam 36, the edge 27 of lever 26 will be free to swing to any position dictated by the temperature of furnace 7. As the lever 38 is lowered, one of its edges 40, 43 or 41 will engage edge 27 to stop this lever in a position corresponding to whether the temperature is low, neutral or high. If the temperature is at its normal value, neutral step 43 will engage edge 27; if the temperature is high, step 41 will engage edge 27; and if the temperature is low, step 40 will engage edge 27. By adjusting member 42 by means of clamping screw 42a, the neutral step 43 can be made longer or shorter, thus increasing or decreasing the range of normal temperature. The final position of lever 38 is used to control the member which moves mercury switch 33 to energize motor 31 and adjust valve 9.

A floating switch actuating lever 46 is pivoted at 47 on one end of lever 48, which is in turn pivoted at 49 and has on its other end a pin 50 that is adapted to engage any one of edges 45L, 45N, or 45H of opening 44 in lever 38. The purpose of the cooperation of the edges 45 and pin 50 will be described below. The left-hand end of actuating lever 46 has a roller 51 thereon which is acted upon by cam 36 to tilt the lever and its supporting lever 48, so that the right-hand end of lever 46 will be elevated to tilt switch 32 and effect the control actions. In order to perform this function, the right end of lever 46 is provided with two extensions or fingers 52 and 53, each with an outside shoulder 46N, that are adapted to, at times, engage pins 54 and 55 respectively on a bracket 56 for the mercury switch 32.

The bracket 56 is loosely supported by a disc 33A that is fastened to and extends in front of plate 33. Pins 54 and 55 have heads 54A and 55A respectively, which are back of the disc 33A to prevent the bracket from moving forward and falling off. The distance between the pins 54 and 55 is slightly less than a diameter of disc 33A, so that the pins can rest against the periphery thereof, and the weight of the bracket will cause them to grip the disc and hold it in place. The bracket is also provided with a pin 56A that extends through a hole 57 formed at the axis of disc 33A, to prevent the bracket from rising too high during its tilting movements. When the bracket is tilted, the finger 52, for example, will engage pin 54 and lift it slightly, permitting pin 55 to move downwardly. As finger 52 recedes, the pins 54 and 55 will again move into engagement with the periphery of disc 33A. If the temperature is at its correct value, shoulders 46N will engage pins 54 and 55 simultaneously, and the entire bracket 56 will be raised and then lowered, this being permitted by the loose fit of pin 56A in hole 57.

Figure 5:
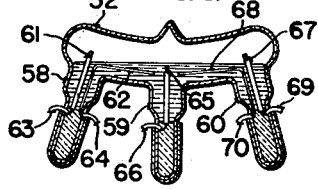
Fig. 5 is a cross-section of the control switch.

In the particular form of the switch 32 illustrated, shown best in Fig. 5, the switch is a mercury switch and comprises a container body portion which is in the form of a curved tube having its concave side uppermost and which is in open communication with pocket extensions 58, 59 and 60 of the container body at the under side of the latter. In the pocket extension 58 there are mounted two contacts 61 and 62. The contact 61 is connected to an external terminal 63 and is insulated from the mercury within the container except at its upper end. The contact 62 is connected with an external terminal 64 and may be in contact with the mercury at all points along its length. The contact 62 includes an upper transverse portion extending along the bottom of the space within the body portion of the container into proximity with the pocket 59 so that in the neutral position of the switch, the contact 62 will be connected by the mercury to the single contact 65 mounted in the pocket 59. When the switch 32 is turned counter-clockwise, as seen in Figs. 1 and 5, from its neutral position, the excess of mercury in the switch over that required to then fill the three pocket extensions shifts clockwise relative to the switch container and then connects the contacts 61 and 62. In the neutral position of the switch, as well as when the latter is shifted clockwise, as seen in Figs. 1 and 5, from its neutral position, the exposed end of the contact 61 is above the mercury and the latter does not connect the contacts 61 and 62.

The contact 65 in the central pocket is connected below the mercury level in the latter to an external terminal 66, and is not insulated from, or out of contact with the mercury in any operative position of the switch. Associated with the pocket 60 are contacts and terminals 67, 68, 69 and 70 similar in arrangement and operation to the contacts and terminals 61, 62, 63 and 64, respectively, except that the elongated transversely extending upper portions of the contacts 62 and 68 face in opposite directions and extend in similar proximity to the central pocket 59 so that in the neutral position of the switch the central contact 65 is connected to the contact 68 as well as to the contact 62. When the switch tilts to the left the mercury moves out of engagement with contact 67, and when the switch tilts to the right, the mercury moves out of engagement with contact 61.

In the operation of the device, cam 36 rotates at a constant speed in a counter-clockwise direction to periodically raise and lower levers 38 and 46. Starting a cycle of operation with the parts in the position shown, cam 36 will lower lever 38 until one of the steps 40, 43 or 41 engages edge 27. At the same time the high part of the cam coming under roller 51 will move this roller downwardly, and, because of the arrangement of the levers, lever 46 will be moved to the right as lever 48 turns counter-clockwise until such time as pin 50 bears against one of the edges 45L, 45N or 45H. If, for example, the temperature of furnace 7 is at its desired value, the edge 43 will engage 27 when lever 38 is lowered. This will in turn bring edge 45N to such a level that the pin 50 will engage it upon the above-described movement of levers 46 and 48. The movement of lever 48 around its pivot until pin 50 engages edge 45N shifts pivot 47 and lever 46 to the right until fingers 52 and 53 will come between and beneath pins 54 and 55. Continued rotation of cam 36 will then move lever 46 around 47 as a pivot until the end of its stroke, during the course of which with pin 50 pressing against edge 45N, the outer shoulders 46N of the fingers 52 and 53 will engage the pins 54 and 55 to move switch 32 to its mid-position. Both shoulders of fingers 52 and 53 will engage pins 54 and 55 at the time the highest portion of cam 36 is over roller 51. If the switch was not level before this operation, one of the shoulders will strike one of the pins until the other shoulder strikes the other pin and thus prevent over travel of the switch. If, however, the temperature of furnace 7 is low, on the down stroke of lever 38 edge 40 will engage edge 27, and edge 45L of opening 44 will be at the level of pin 50. With this condition, the lever 46 will not be moved so far to the right, and upon its upward stroke finger 52 will engage pin 54 to tilt switch 32 clockwise and close its right contacts 68 and 67. In a similar manner, if the temperature of furnace 7 is high, the edge 41 of lever 38 will engage edge 27 to bring edge 45H of opening 44 in line with pin 50. The lever 46 will then be shifted to the right so that upon its upward movement finger 53 will engage pin 55 and tilt switch 32 counter-clockwise to close its left contacts. If desired, lever 46 may be formed in two parts resiliently held together to provide a safety release connection between cam 36 and bracket 56.

When the furnace temperature is low and the right contacts of switch 32 are closed, a circuit is closed from line $L_1$, through conductor 71, contact 68, contact 67, conductor 72 to motor 31, and conductor 73 to line $L_2$. This energizes the motor so that it will rotate in a direction to open valve 9 and let more fuel into the furnace. The conductor 72 also leads to one side of indicating lamp L of a suitable color to show that the temperature is low and the valve 9 is being opened.

When the temperature of the furnace is high and the left contacts of switch 32 are closed, a circuit will be closed from line $L_1$, through conductor 71, contact 62, contact 61, conductor 74, motor 31, and conductor 73 to line $L_2$. This energizes the motor so that it will rotate in a direction to close valve 9 and decrease the fuel going to the furnace. At the same time, a circuit through lamp H will be closed to indicate that the temperature is high and that the valve 9 is being closed.

At all other times when the temperature of the furnace is at its normal value, a circuit will be closed from line $L_1$ through conductor 71, contacts 62 and 68, contact 65, conductor 75, lamp N and conductor 73 to line $L_2$. Thus when the temperature of the furnace is at its normal value, the lamp N of suitable color will be lighted and the setting of valve 9 will remain constant since motor 31 is deenergized.

It is noted that in actual use the conductors 71, 72, 74 and 75 would be formed in a single cable and brought out through a suitable opening in case 1 to the motor 31 and the indicating lights.

Figure 2:
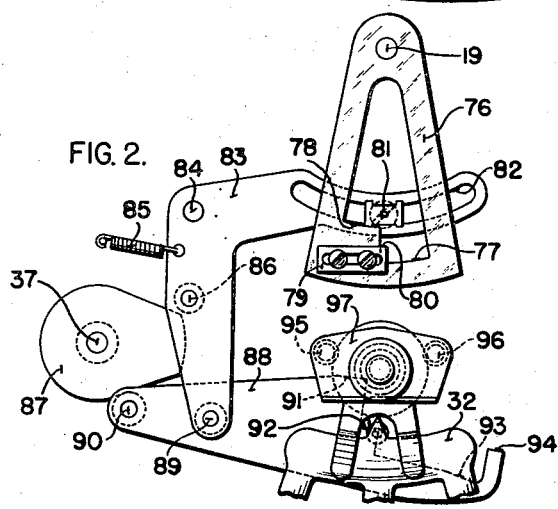
Fig. 2 is a view showing a modified system of levers to be used to tilt a control switch.

There is shown in Fig. 2 a modification of the invention which performs the same functions as that above described, but with a different series of levers. In this modification, instead of the lever 26, there is provided a triangularly shaped member 76 that is adapted to be shifted around shaft 19 in the same manner as the lever 26. This member 76 has an opening therein that is provided with edges 77 and 78 which serve the same functions as edges 40 and 41 respectively, of lever 38. Adjustably mounted on member 76 is a small member 79 which is provided with edge 80 that corresponds to edge 43 on member 42. The member 79 can be adjusted longitudinally to vary the length of the neutral step and thereby the range of temperature through which furnace 7 can vary before an adjustment of valve 9 takes place.

A feeler 81 which is adapted to be periodically moved into contact with one of the edges 77, 80 or 78 is adjustably secured in slot 82 of bellcrank lever 83 that is pivoted at 84. This lever is biased by a spring 85 in a clockwise direction and is periodically moved in a counter-clockwise direction by engagement between a roller 86 mounted thereon and a constantly rotating cam 87 mounted on shaft 37. The cam 87 is driven at a constant speed, as was cam 36, by motor 34. A switch controlling lever 88 is pivotally mounted at 89 on bell-crank 83 and has a normal gravitational bias clockwise to move roller 90 into engagement with cam 87.

A series of switch tilting edges 91, 92, 93 and 94 are formed on the right end of lever 88 in the relation shown in the drawings. Edges 91 and 92 are adapted to engage, at times, a pin 95 and edges 93 and 94 are adapted to engage pin 96 on the switch holding bracket 97 that is mounted on a disc 33A as was bracket 56, although it is not described in detail here.

In the operation of this modification, cam 87, rotating in a clockwise direction, first turns bell-crank 83 counter-clockwise until the feeler 81 is above edge 78. Continued rotation of the cam will then permit bell-crank 83 and feeler 81 to lower under the bias of spring 85 until the feeler engages one of the edges 77, 80, or 78. If, for example, the temperature of the furnace 7 is at its desired value, the feeler 81 will engage edge 80 and pivot 89 will be moved to its middle position. Continued rotation of cam 87 will then bring its high portion over roller 90 to move lever 88 counter-clockwise. In the middle position of bell-crank 83, the edges 92 and 93 of lever 88 will respectively engage pins 95 and 96 of the switch holder 97 to level the switch out and make contacts to light lamp N. It should be noted that both of the edges 92 and 93 will engage the pins 95 and 96 only at the extreme upward end of their stroke when the highest part of cam 87 is over roller 90. In this manner, if the switch had previously been tilted, first one of the edges would engage its pin until the switch was level, then the other edge would engage its pin to prevent over-travel of the switch.

If the temperature in furnace 7 is high, the feeler 81 will engage edge 77 and pivot point 89 will be moved to its left position. When this occurs the counter-clockwise movement of lever 88 by cam 87 will bring edge 94 into engagement with pin 96 to tilt the switch 32 counter-clockwise and close contacts to motor 31 through conductors 71, 72 and 73 to energize the motor so that its rotation will close valve 9. The circuit to light H is also closed at this time.

If the temperature of furnace 7 is low, the feeler 81 will engage edge 78 and pivot point 89 will be held in its right-hand position. As the cam 87 then moves lever 88 in its counter-clockwise direction, the edge 91 will engage pin 95 and tilt switch 32 in a clockwise direction. This will close the contacts in the right end of the switch and energize motor 31, through conductors 71, 74 and 73 to run it in a direction to open valve 9. At the same time, the circuit to light L is closed to indicate that the temperature is low and that the valve 9 is being opened.

From the above description it will be observed that the position of member 26 is dependent, in a novel fashion, upon the relative values of the condition of the heater 7 as exemplified by the position of the pen and the desired value thereof as exemplified by the position of the index. This in turn controls the extent of the path of movement of the pivot 47 or 89 upon which the actuating member 46 or 88 is mounted.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a measuring and control instrument, a control device, an actuating member adapted to move said control device, a support for said actuating member, a part adapted to be positioned in accordance with the value of a measurable condition, and a single cam to move said support to a predetermined position depending upon that of said part, and to thereafter move said actuating member on its support into cooperating relationship with said control device.

2. In a measuring and control instrument, a member movable to three positions depending upon whether the value of a measurable condition is high, normal or low, said member being provided with edges corresponding to each position thereof, a support having a projection thereon, cam to move said support until said projection cooperates with one of said edges, an actuating device pivoted on said support, a control device adapted to be moved by said actuating device, and said cam thereafter moving said actuating device around its pivot against said control device.

3. In a measuring and control instrument, a member positioned in accordance with the present value of a condition, a member positioned in accordance with the desired value thereof, an angularly-shaped, pivoted lever biased in one direction, a part supported by and pivoted to one arm of said lever, means to move said part around its pivot into engagement with both of said first-named members against the bias of said lever, whereby said lever will be moved to a position relative to the desired and present value of the condition.

4. In a measuring and control instrument, a pivoted lever, means to move said lever to a position relative to the desired and present values of a measurable condition, a part selectively engaging said lever in accordance with its position, a pivoted support, an actuating member pivoted thereto, and a cam to move said support into engagement with a portion of said part to thereby shift the pivot of said actuating member and to thereafter move said actuating member through a path predetermined by the position of its pivot.

5. In a measuring and control instrument, a control device adapted to be moved to various positions, an actuating member for moving said control device, a support for said actuating member, means to shift said support to one of a series of positions to thereby position said actuating member, and to thereafter pivot said actuating member on its support into engagement with to move said control device selectively in accordance with the position of said support.

6. In a measuring and control instrument, a member movable in accordance with the present value of and a desired value of a measurable condition, a periodically operated part adapted to engage said member with selected portions thereof depending upon the position of said member, a pivoted support having a projection thereon, an actuating member pivoted to said support, means to move said projection into engagement with a portion of said part depending upon the portion of said part engaged by said member to thereby shift the pivot of said actuating member, and to thereafter move said actuating member through a path that is predetermined by the position of its pivot.

7. In a measuring and control instrument, a member positioned in accordance with the value of a condition, a projection positioned in accordance with a desired value of said condition, a part free to move with respect to said member and projection, means to resiliently hold said part in engagement with said member and said projection to follow the movements thereof, a support for said part sharing the movements thereof, and means responsive to the position of said support to control said condition.

8. In a measuring and control instrument, control means, an actuating member for said control means comprising a floating lever, a moving pivot for said member, means for adjusting said pivot in accordance with a variable condition to bodily shift said member, and power actuated means for moving said member about said pivot to effect control of the said control means.

9. The combination of claim 8 in which the means for adjusting said pivot includes an element responsive to the variable condition, an element adjustable to vary the normal value of said condition, and a member carrying said pivot which is positioned jointly by said elements.

COLEMAN B. MOORE.